April 9, 1968 C. F. AULT 3,377,584

CIRCUITRY FOR ELIMINATING TRANSIENTS IN
A MAGNETIC HEAD SWITCHING SYSTEM

Filed Jan. 5, 1965

INVENTOR
C. F. AULT

BY D. E. Snedeker
ATTORNEY

United States Patent Office 3,377,584

Patented Apr. 9, 1968

3,377,584

CIRCUITRY FOR ELIMINATING TRANSIENTS IN A MAGNETIC HEAD SWITCHING SYSTEM

Cyrus F. Ault, Lincroft, N.J., assignor to Bell Telephone Laboratories, Incorporated, New York, N.Y., a corporation of New York Filed Jan. 5, 1965, Ser. No. 423,417
9 Claims. (Cl. 340—174.1)

ABSTRACT OF THE DISCLOSURE

In the readout circuitry for a plurality of individual transducer heads positioned adjacent a magnetic storage surface, a delay line and difference circuitry are employed to reduce the effects of transients created by the transducer head selection process.

Figures 1, 2:
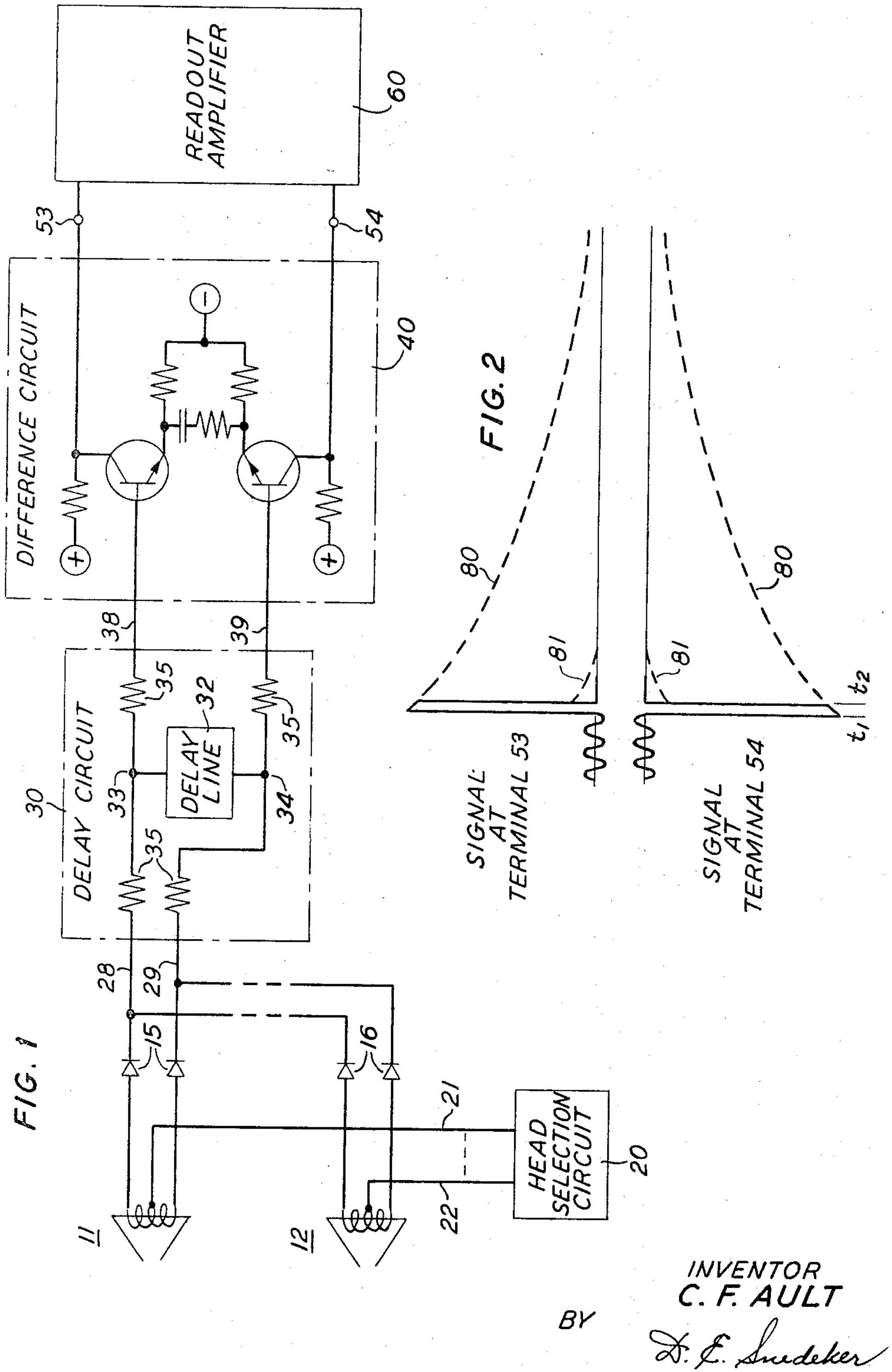

This invention relates to information storage systems, and more particularly to switching arrangements therein for selecting individual ones of a plurality of transducers for reading or recording information.

In information storage systems employing a multiple channel storage medium, such as a magnetic drum or disk, it is well known to associate individual transducers with each of the storage channels and to selectively connect one or more of the transducers with common input or output circuitry so that information may be recorded on or read from the associated channel or channels. Similarly, it is known to dispose a plurality of individually selectable transducers along the length of a single storage channel so that information may be recorded on and read from particular areas along the storage channel adjacent the selected transducer or transducers. Switching arrangements for such transducer selection purposes generally employ respective switching elements connected in circuit with each transducer and the common input or output circuitry. The switching elements are often simply unilateral conducting devices such as diodes, for example, which may be biased selectively in a conducting or nonconducting state. Thus, the several switching elements are normally biased in a nonconducting state and a particular transducer is selected for reading or recording operation by biasing the appropriate switching element or elements associated therewith in a conducting state.

Transient signals generated as a result of transducer selection may be sufficient to interfere adversely with the system recording or reading operation, particularly the latter. The transient signals are due primarily to differences in the electrical characteristics of the various components in the present selected transducer circuit path from the components in the previously selected transducer circuit path. Further, transient signals are generated due to differences in the electrical characteristics of the respective components connected in circuit with the several branches of the individual transducer circuit paths where a balanced transducer output is employed. The transducer switching transients are often many times the magnitude of the information to be read from the storage medium by the selected transducer and thus are sufficient to mask or override the desired information playback signal. Accordingly, one solution to the problem has been to provide a fixed period of delay for system recovery after a transducer switching operation, the delay being sufficient to allow the transient signals generated by the switching operation to subside before reading is initiated. However, as the system operating speed is increased, and a concomitant decrease in the interval of time between transducer selection and a subsequent reading operation becomes desirable, this solution ceases to be practicable.

Other known attempts at solving the problem of switching transients have fallen short or have proved disadvantageous due to the cost or complexity thereof. For example, differentiating circuitry has been interposed in circuit with the transducers and the common readout circuitry. Differentiation of the transient signals decreases somewhat the delay necessary between switching operation and reading operation, but the delay interval still must be many times greater than the interval required for example in a digital system to read out a bit of information. In other instances, the costly and time-consuming process of carefully selecting and matching the various circuit components has been employed in an effort to reduce or eliminate the cause of the switching transients.

It is therefore a general object of this invention to provide a simple, compact, and economical transducer switching system which substantially eliminates the effects of switching transients and which overcomes the disadvantages and shortcomings of known arrangements.

More particularly, it is an object of this invention to provide a simple and economical arrangement for selectively connecting individual ones of a plurality of transducers to a common readout amplifier wherein the amplifier recovery time required between switching operation and subsequent reading operation with the selected transducer is minimized.

A further object of this invention is to reduce or eliminate the effects of transducer switching transients without modifying the system operation and without requiring extensive additional circuitry.

In accordance with a feature of my invention, the above and other objects are contained in an illustrative embodiment of a transducer switching system wherein delay and differencing circuitry is connected in circuit with a plurality of individually selectable transducers and a common readout amplifier. Switching transient signals generated by selection of one of the transducers for connection to the readout amplifier are delayed for a predetermined period of time, and the delayed transient signals are then differenced with the original transient signals. Thus, after the predetermined period of time defined by the delay circuitry, advantageously less than the period of time required to read a bit of information from the storage medium, the switching transient signals are substantially canceled and reading operation may be initiated with the selected transducer. The recovery of the system from transducer switching transients, therefore, is essentially complete almost immediately upon switching from one transducer to another transducer.

Assuming that the delay and differencing circuitry is to remain connected in the information playback circuit path during the subsequent reading operation, it is appreciated that it must have no adverse effect on the processing of the recorded information. In accordance with another aspect of my invention, the delay and differencing circuitry connected in circuit with the transducers and the readout amplifier, rather than adversely affecting the processing of the recorded information, tends to improve the reproduction process by reducing the effects of interference and spillover between adjacent recorded bits of information. This becomes particularly important as the recording density is increased. Moreover, the rejection of noise during the reading operation is improved through use of my delay and differencing arrangement, thereby increasing the signal-to-noise ratio of the information play-back signal prior to its amplification by the readout amplifier.

Accordingly, a feature of my invention relates to the use of delay and differencing circuitry in a transducer switching arrangement for substantially eliminating the effects of switching transients on the playback of magnetically recorded information.

A further feature of my invention relates to circuitry for selectively connecting individual ones of a plurality of transducers to a common output circuit, which circuitry provides for delaying transducer selection signals and for differencing the delayed selection signal with the original selection signal before applying it to the output circuit.

The above and other objects and features of the present invention may be fully apprehended from the following detailed description when considered with reference to the accompanying drawing, in which:

FIG. 1 shows an illustrative embodiment of a transducer switching system in accordance with the principles of the present invention; and FIG. 2 shows several waveforms useful in describing the operation of the illustrative embodiment of the present invention.

In FIG. 1 of the drawing, an illustrative embodiment of a transducer switching arrangement is shown for selectively interconnecting individual ones of a plurality of transducers, such as transducers 11 and 12, with output circuit terminals 53 and 54, which are connected to readout amplifier 60. Transducers 11 and 12 are depicted in the drawing as magnetic heads which are associated with respective locations relative to a magnetic storage medium (not shown) for recording information on or reading information from the storage medium. Head selection circuit 20 is connected via respective individual selection leads to each of the plurality of transducers. Thus, transducers 11 and 12 are individually selectable for connection to common readout amplifier 60 during reading operation, via respective selection leads 21 and 22, by head selection circuit 20. Head selection circuit 20 is also employed for head selection purposes during recording operation to connect individual ones of the transducers to recording circuitry (not shown).

The illustrative transducer switching arrangement shown in FIG. 1 employs respective diodes, such as diodes 15 and 16, connected in circuit with each transducer and with transducer output leads 28 and 29 to readout amplifier 60. For transducer selection purposes, these diodes may be selectively biased in a conducting or nonconducting state by appropriate selection signals over the individual selection leads from head selection circuit 20. Therefore, to select a particular one of the transducers for reading operation, such as transducer 11, head selection circuit 20 applies a signal over individual selection lead 21 to bias diodes 15 in a conducting state, thereby providing a conducting path between transducer 11 and leads 28 and 29 to readout amplifier 60. At the same time, head selection circuit 20 applies a signal over each of the other selection leads, such as selection lead 22, to bias diodes 16 and all other diodes associated with nonselected transducers in a nonconducting state.

As a result of transducer selection in the manner just described, transient signals may be generated of sufficient magnitude to interfere adversely with reading operation, such as through temporary overloading of readout amplifier 60. These transient signals, often as large as one hundred times the magnitude of the low level information signal extracted from the storage medium by the selected transducer, arise primarily from differences in the electrical characteristics of the diodes and other components connected in the present selected transducer path from the diodes and other components in the previously selected transducer path. Switching transient signals further arise due to differences in the electrical characteristics of the diodes connected in the several circuit branches of the individual transducer paths where a balanced or double-ended transducer output is employed as shown in the illustrative embodiment in FIG. 1. Accordingly, heretofore it has been generally necessary to provide a predetermined period of delay between transducer selection and subsequent reading operation to ensure system recovery from the switching transients prior to initiation of reading with the selected transducer.

As depicted in FIG. 2, the recovery time may be quite long relative to the interval required for reading a bit of information from the storage medium, referred to herein as a bit interval of time. Assume, for example, that prior to time $t_1$ in FIG. 2, diodes 16 are rendered conducting by head selection circuit 20 and that transducer 12 is reading information from the storage medium. The information readout by transducer 12 is directed through diodes 16 to transducer output leads 28 and 29, which are assumed for the present to be connected directly to readout amplifier 60 via terminals 53 and 54, respectively. One cycle of the representative readout information shown in FIG. 2 prior to time $t_1$ corresponds to a bit interval of time. At time $t_1$ head selection circuit 20 applies appropriate signals over leads 21 and 22, respectively, to render diodes 15 conducting and to render diodes 16 nonconducting, thereby disconnecting transducer 12 from leads 28 and 29 and connecting transducer 11 thereto. Differences in the electrical characteristics of the several diodes 15 and 16 produce a switching transient signal at time $t_1$, as shown in FIG. 2, of a magnitude many times greater than the magnitude of the information signal applied to readout amplifier 60. Before reading operation with transducer 11 can be initiated, therefore, readout amplifier 60 must be permitted to recover from the switching transient. The delay required for recovery of amplifier 60 depends upon the time constant of the circuit including the selected transducer and, as indicated by dashed lines 80 in FIG. 2, the delay is generally a period many times greater than a bit interval of time.

In accordance with my invention, however, the delay between transducer selection and reading operation is substantially reduced to a period on the order of several bit intervals of time or less through the use of delay circuit 30 and difference circuit 40 connected in circuit with readout amplifier 60 and each of the transducers. Difference circuit 40, which may comprise a difference amplifier arrangement by way of example, has a pair of inputs connected to leads 38 and 39, respectively. The output of difference circuit 40 is shown double-ended in FIG. 1 and is connected to terminals 53 and 54. It will be apparent from the discussion hereinbelow that other differencing arrangements, such as a transformer circuit, may be employed readily in difference circuit 40 and that the output thereof may be single-ended or double-ended as desired. Further, it will be apparent that the outputs of transducers 11 and 12 may be single-ended on transducer output lead 28 for example, transducer output lead 29 being connected to a reference potential such as ground.

Delay circuit 30 comprises delay line 32 and impedances 35 for matching the characteristic impedance of delay line 32 to the circuitry connected thereto. Delay line 32 is connected in parallel with each of the transducers via terminals 33 and 34 and transducer output leads 28 and 29 which are, in turn, connected over leads 38 and 39 to the respective inputs of difference circuit 40. Thus, all signals appearing on transducer output lead 28 are directed over lead 38 to a first input of difference circuit 40 and also through delay line 32 over lead 39 to a second input of difference circuit 40. Similarly, all signals appearing on transducer output lead 29 are directed over lead 39 to the second input of difference circuit 40 and also through delay line 32 over lead 38 to the first input of difference circuit 40. Accordingly, the output of difference circuit 40 at terminal 53 reflects the difference between a signal appearing on lead 28 and said signal delayed by delay line 32. The output of difference circuit 40 at terminal 54 is the complement of the signal at terminal 53 and represents the difference between a signal appearing on transducer output lead 29 and said signal delayed by delay line 32.

With reference to FIG. 2, therefore, it may be appreciated that after a period of time determined by the delay interval provided by delay line 32, the switching transient signals are substantially canceled at output terminals 53 and 54. The delay interval provided by delay line 32 is shown in FIG. 2 as the period between times $t_1$ and $t_2$, which delay interval is advantageously less than one bit interval of time. For example, the delay interval of delay line 32 may be equal to one-half bit interval of time, which is particularly advantageous in information storage systems wherein the information is recorded using a phase modulation scheme. Thus, the recovery of readout amplifier 60 from transducer switching transients is substantially complete at time $t_2$, as shown by the solid line in FIG. 2, if it is assumed that delay line 32 has negligible resistance to current flow therethrough. If the resistance of delay line 32 is not negligible, then the magnitude of the original signal applied to difference circuit 40 will be slightly greater than the magnitude of the delayed signal applied thereto due to the voltage drop introduced by delay line 32. Accordingly, recovery from the transducer switching transient, though substantially complete at time $t_2$, may require an additional period of delay, as indicated by dashed lines 81 in FIG. 2, before reading operation can be initiated. The additional period of delay may be, for example, on the order of several bit intervals of time or less.

Although the above discussion and the illustrative embodiment shown in the drawing contemplate employment of the present arrangement in a transducer switching circuit for an information storage system, it will be appreciated that the arrangement may be employed in various other applications wherein it is desired to quickly dissipate the effects of switching transients arising from switching between several circuits. Further, it will be appreciated that the present transducer switching system may be employed without adverse effects on the playback and processing of the recorded information and, in fact, tends in many instances to improve processing by reducing the effects of noise and of interference and spillover between adjacent recorded bits of information.

It is to be understood, therefore, that the above-described arrangements are merely illustrative of the principles of the present invention. Numerous other arrangements may be devised by those skilled in the art without departing from the spirit and scope of the invention.

What is claimed is:

1. In combination, a plurality of input circuits, an output circuit, means for selectively connecting individual ones of said input circuits to said output circuit, said connection of individual ones of said input circuits to said output circuit producing a transient signal of random duration, delay and differencing circuitry, and means including said delay and differencing circuitry connected in circuit with said output circuit and said plurality of input circuits for substantially reducing the duration of said transient signal.

2. The combination, in accordance with claim 1, wherein said delay and differencing circuitry comprises a delay line having a predetermined period of delay and wherein said last-mentioned means further includes means for connecting said delay line in circuit with said input circuits such that the duration of said transient signal is substantially limited to said predetermined delay period of said delay line.

3. The combination in accordance with claim 2 wherein said delay and differencing circuitry further comprises differencing means for providing an output signal to said output circuit, said output signal corresponding to the difference between signals applied to first and second inputs of said differencing means and wherein said connecting means comprises means for connecting said delay line in circuit with said plurality of input circuits and at least one of said first and second inputs of said differencing means.

4. In combination, a plurality of input circuits, an output circuit, input circuit selection means, means including respective elements associated with each of said input circuits for individually connecting said input circuits to said output circuit, means including said input circuit selection means for rendering said elements normally nonconducting and for selectively rendering said elements associated with a respective input circuit conducting to connect said respective input circuit to said output circuit, said connection of said respective input circuit to said output circuit generating a transient signal of random duration, and delay and differencing circuitry connected in circuit with said output circuit and said input circuits for substantially reducing the duration of said transient signal.

5. In a system for selectively connecting individual ones of a plurality of transducers to a common readout amplifier, means for substantially eliminating the effects of transducer selection transients on said readout amplifier comprising difference circuit means, means connecting the output of said difference circuit means to said readout amplifier, readout circuit means, means for selectively connecting individual ones of said transducers to said readout circuit means, delay circuit means, first means connecting said readout circuit means directly to said difference circuit means, and second means connecting said readout circuit means to said difference circuit means through said delay circuit means.

6. In a system in accordance with claim 5 wherein said readout circuit means comprises a first output conductor and a second output conductor, wherein said difference circuit means comprises a first input and a second input, wherein said first means comprises means connecting said first output conductor to said first input and means connecting said second output conductor to said second input, and wherein said second means comprises means connecting said delay circuit means between said first and second inputs of said difference circuit means.

7. A transducer switching system comprising a plurality of transducers; a readout amplifier; means selectively connecting individual ones of said transducers to said readout amplifier; said connection of individual ones of said transducers to said readout amplifier generating an unwanted transient signal of random duration; and means connected in circuit with said transducers and said readout amplifier for reducing the duration of said transient signal substantially to a predetermined duration, said reducing means comprising means for delaying said transient signal for a period equal to said predetermined duration, and means for differencing said delayed transient signal with said transient signal.

8. A transducer switching system comprising a plurality of transducers for reading information from a storage medium, a readout amplifier, readout circuit means, individual diode means respectively connecting each of said transducers to said readout circuit means, transducer selection means for selectively rendering conducting said individual diode means connecting respective ones of said transducers to said readout circuit means, a difference circuit having first and second inputs and an output, means connecting said output of said difference circuit to said readout amplifier, first means connecting said readout circuit means to at least one of said first and second inputs of said difference circuit, and second means including a delay line connecting said readout circuit means to at least the other of said first and second inputs of said difference circuit.

9. A transducer switching system in accordance with claim 8 wherein said second means includes delay line impedance matching means connected to said readout circuit means and to said difference circuit.

References Cited

UNITED STATES PATENTS

| | | |
|---|---|---|
| 2,927,304 | 3/1960 | Paquin. |
| 2,877,451 | 3/1959 | Williams. |
| 2,611,025 | 9/1952 | Jankowski. |

BERNARD KONICK, *Primary Examiner.*

A. I. NEUSTADT, *Assistant Examiner.*